(12) United States Patent
Kaikkonen et al.

(10) Patent No.: US 12,089,162 B2
(45) Date of Patent: Sep. 10, 2024

(54) METHOD FOR ADAPTING UE RRM MEASUREMENTS FOR POWER SAVING

(71) Applicant: Nokia Technologies Oy, Espoo (FI)

(72) Inventors: Jorma Kaikkonen, Oulu (FI); Timo Koskela, Oulu (FI); Lars Dalsgaard, Oulu (FI); Juha Karjalainen, Oulu (FI); Sami-Jukka Hakola, Kempele (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 432 days.

(21) Appl. No.: 17/281,427

(22) PCT Filed: Oct. 22, 2019

(86) PCT No.: PCT/FI2019/050745
§ 371 (c)(1),
(2) Date: Mar. 30, 2021

(87) PCT Pub. No.: WO2020/089513
PCT Pub. Date: May 7, 2020

(65) Prior Publication Data
US 2022/0007293 A1 Jan. 6, 2022

(51) Int. Cl.
*H04W 52/02* (2009.01)
*H04B 17/309* (2015.01)
(Continued)

(52) U.S. Cl.
CPC ...... *H04W 52/0251* (2013.01); *H04B 17/309* (2015.01); *H04W 24/02* (2013.01);
(Continued)

(58) Field of Classification Search
CPC . H04W 52/0251; H04W 24/02; H04W 24/08; H04W 64/006; H04W 76/28;
(Continued)

(56) References Cited

U.S. PATENT DOCUMENTS

2013/0308510 A1* 11/2013 Ji ............... H04W 52/0251
370/311
2015/0119044 A1 4/2015 Hwang et al.
(Continued)

FOREIGN PATENT DOCUMENTS

CN 101543124 A * 9/2009 ............ H04W 68/02
WO 2014/020127 A1 2/2014
(Continued)

OTHER PUBLICATIONS

Partial European Search Report received for corresponding European Patent Application No. 19878077.7, dated May 6, 2022, 12 pages.
(Continued)

*Primary Examiner* — Said M Elnoubi
(74) *Attorney, Agent, or Firm* — Lippes Mathias LLP

(57) ABSTRACT

In accordance with example embodiments of the invention as disclosed herein there is at least a method and apparatus to perform determining a mobility or measurement adaptation state of a user equipment, wherein the determining is based on one of (1310): a new transmission configuration indication state for physical downlink control channel for at least one control resource set is configured, user equipment rotational activity exceeds specific threshold limit of a threshold associated with a mobility parameter by X degrees after network indicates user equipment to be in low mobility or measurement adaptation state, user equipment activates new panel due to signal quality degradation, or a threshold condition of the mobility parameter is applied (1320); and in response to the determining, scaling or relaxing at least one of a radio resource management measurement period or a threshold condition of the mobility parameter (1330).

15 Claims, 10 Drawing Sheets

(51) Int. Cl.
*H04W 24/02* (2009.01)
*H04W 24/08* (2009.01)
*H04W 64/00* (2009.01)
*H04W 76/28* (2018.01)
*H04W 36/30* (2009.01)
*H04W 36/32* (2009.01)

(52) U.S. Cl.
CPC ......... *H04W 24/08* (2013.01); *H04W 64/006* (2013.01); *H04W 76/28* (2018.02); *H04W 36/30* (2013.01); *H04W 36/32* (2013.01)

(58) Field of Classification Search
CPC ..... H04W 36/30; H04W 36/32; H04W 88/02; H04B 17/309; Y02D 30/70
See application file for complete search history.

(56) References Cited

U.S. PATENT DOCUMENTS

| | | | | |
|---|---|---|---|---|
| 2015/0215830 | A1* | 7/2015 | Dalsgaard | H04W 36/0088 455/444 |
| 2018/0205469 | A1* | 7/2018 | Nagaraja | H04L 1/0026 |

FOREIGN PATENT DOCUMENTS

| | | |
|---|---|---|
| WO | 2018/063425 A1 | 4/2018 |
| WO | 2018/073810 A1 | 4/2018 |
| WO | 2018/156696 A1 | 8/2018 |
| WO | 2021/058369 A1 | 4/2021 |

OTHER PUBLICATIONS

"Discussion on open issues in WUS RRM in NB-IoT", 3GPP TSG-RAN WG4 Meeting #87, R4-1806864, Agenda : 6.19.4.4, Qualcomm Incorporated, May 21-25, 2018, pp. 1-3.

"Considerations on study item conclusion", 3GPP TSG RAN WG1 #96, R1-1901766, Agenda : 7.2.9.4, vivo, Feb. 25-Mar. 1, 2019, 8 pages.

"New SID: Study on UE Power Saving in NR", 3GPP TSG RAN Meetings #80, RP-181463, Agenda : 9.1.8, CATT, Jun. 11-14, 2018, 5 pages.

"3rd Generation Partnership Project; Technical Specification Group Radio Access Network; NR;Requirements for support of radio resource management(Release 15)", 3GPP TS 38.133, V15.3.0, Sep. 2018, pp. 1-136.

"3rd Generation Partnership Project; Technical Specification Group Radio Access Network; NR;Radio Resource Control (RRC) protocol specification(Release 15)", 3GPP TS 38.331, V15.3.0, Sep. 2018, pp. 1-445.

"UE Power Consumption Reduction in RRM Measurements", 3GPP TSG-RAN WG1 Meeting #94bis, R1-1811284, Agenda : 7.2.9.3, Qualcomm Incorporated, Oct. 8-12, 2018, pp. 1-8.

"RRM Aspects of NR UE Power Saving", 3GPP TSG-RAN WG1 Meeting #94bis, Tdoc R1-1811503, Agenda : 7.2.9.3, Ericsson, Oct. 8-12, 2018, pp. 1-3.

"UE Power Consumption Reduction in RRM Measurements", 3GPP TSG RAN WG1 Meeting #94bis, R1-1810156, Agenda : 7.2.9.3, Huawei, Oct. 8-12, 2018, 4 pages.

"Discussion on UE Power Consumption Reduction in RRM Measurement", 3GPP TSG RAN WG1 Meeting #94bis, R1-1810894, Agenda : 7.2.9.3, Samsung, Sep. 8-12, 2018, pp. 1-4.

"UE Power saving scheme for RRM measurements", 3GPP TSG RAN WG1 Meeting #94bis, R1-1810564, Agenda : 7.2.9.3, CATT, Oct. 8-12, 2018, 5 pages.

"UE power Consumption Reduction in RRM Measurements", 3GPP TSG RAN WG1 Meeting #94bis, R1-1810988, Agenda : 7.2.9.3, OPPO, Oct. 8-12, 2018, 4 pages.

"Miscellaneous Corrections based on endorsed CRs in RAN2#103", 3GPP TSG-RAN2#103, R2-1813084, Rapporteur , Aug. 20-24, 2018, 22 pages.

International Search Report and Written Opinion received for corresponding Patent Cooperation Treaty Application No. PCT/FI2019/050745, dated Feb. 14, 2020, 13 pages.

"Serving Cell RRM Relaxation for WUS-Capable UE", 3GPP TSG-RAN WG4 #86, R4-1801960, Agenda : 6.18.4.3, Qualcomm Incorporated, Feb. 26-Mar. 2, 2018, pp. 1-4.

Extended European Search Report received for corresponding European Patent Application No. 19878077.7, dated Sep. 13, 2022, 20 pages.

"UE power consumption reduction in RRM measurements", 3GPP TSG-RAN WG1 Meeting #94bis, R1-1810797, Agenda : 7.2.9.3, Intel Corporation, Oct. 8-12, 2018, pp. 1-3.

"Considerations on potential techniques for UE power saving", 3GPP TSG RAN WG1 Meeting #94bis, R1-1810337, Agenda : 7.2.9.2.1, ZTE, Oct. 8-12, 2018, pp. 1-4.

"Motivation for New SID: Study on UE Power Saving in NR", 3GPP TSG RAN Meeting #77, RP-171825, Agenda : 9.1, Vivo, Sep. 11-15, 2017, pp. 1-9.

"Offline outcome of UE power Consumption Reduction in RRM Measurements", 3GPP TSG RAN WG1 Meeting #94bis, R1-1811962, Agenda : 7.2.9.3, Vivo, Oct. 8-12, 2018, pp. 1-6.

"UE Power Consumption Reduction in RRM Measurements", 3GPP TSG RAN WG1 Meeting #95, R1-1813622, Agenda : 7.2.9.3, Nokia, Nov. 12-16, 2018, 7 pages.

"3rd Generation Partnership Project; Technical Specification Group Radio Access Network; NR; User Equipment (UE) procedures in Idle mode and RRC Inactive state (Release 17)", 3GPP TS 38.304, V17.1.0, Jun. 2022, pp. 1-50.

\* cited by examiner

| DRX cycle | $T_{SSB\_measurement\_period\_intra}$ |
|---|---|
| No DRX | max[ 200ms, ceil( 5 x $K_p$) x SMTC period]$^{Note\ 1}$ |
| DRX cycle≤ 320ms | max[ 200ms, ceil(1.5x 5 x $K_p$) x max(SMTC period,DRX cycle)] |
| DRX cycle>320ms | ceil( 5 x $K_p$ ) x DRX cycle |
| NOTE 1: If different SMTC periodicities are configured for different cells, the SMTC period in the requirement is the one used by the cell being identified | |

FIG. 1

| DRX cycle | $T_{SSB\_measurement\_period\_intra}$ |
|---|---|
| No DRX | max[ 400ms, ceil($M_{meas\_period\_w/o\_gaps}$ x $K_p$ x $K_{RLM}$) x SMTC period]$^{Note\ 1}$ |
| DRX cycle≤ 320ms | max[ 400ms, ceil(1.5x $M_{meas\_period\_w/o\_gaps}$ x $K_p$ x $K_{RLM}$) x max(SMTC period,DRX cycle)] |
| DRX cycle>320ms | ceil($M_{meas\_period\_w/o\_gaps}$ x$K_p$ x $K_{RLM}$ ) x DRX cycle |
| NOTE 1: If different SMTC periodicities are configured for different cells, the SMTC period in the requirement is the one used by the cell being identified | |

FIG. 2

| DRX cycle | $T_{PSS/SSS\_sync\_intra}$ |
|---|---|
| No DRX | max[ 600ms, ceil( [5] x $K_p$) x SMTC period]$^{Note\ 1}$ |
| DRX cycle≤ 320ms | max[ 600ms, ceil(1.5x [5] x $K_p$) x max(SMTC period,DRX cycle)] |
| DRX cycle>320ms | Ceil([5] x $K_p$) x DRX cycle |
| NOTE 1: If different SMTC periodicities are configured for different cells, the SMTC period in the requirement is the one used by the cell being identified | |

FIG. 3

| DRX cycle | $T_{PSS/SSS\_sync\_intra}$ |
|---|---|
| No DRX | max[ 600ms, ceil($M_{pss/sss\_sync\_w/o\_gaps}$ x $K_p$ x $K_{RLM}$) x SMTC period x $CSSF_{intra}$ ]$^{Note\ 1}$ |
| DRX cycle≤ 320ms | max[ 600ms, ceil(1.5 x $M_{pss/sss\_sync\_w/o\_gaps}$ x $K_p$ x $K_{RLM}$) x max(SMTC period,DRX cycle) x $CSSF_{intra}$ ] |
| DRX cycle>320ms | Ceil($M_{pss/sss\_sync\_w/o\_gaps}$ x $K_p$ x $K_{RLM}$) x DRX cycle x $CSSF_{intra}$ |
| ... | ... |
| NOTE 1: If different SMTC periodicities are configured for different cells, the SMTC period in the requirement is the one used by the cell being identified | |

FIG. 4

```
SSB-MTC ::=                  SEQUENCE {
  periodicityAndOffset       CHOICE {
    sf5                      INTEGER (0..4),
    sf10                     INTEGER (0..9),
    sf20                     INTEGER (0..19),
    sf40                     INTEGER (0..39),
    sf80                     INTEGER (0..79),
    sf160                    INTEGER (0..159)
  },
  duration                   ENUMERATED { sf1, sf2, sf3, sf4, sf5 }
}

SSB-MTC2 ::=                 SEQUENCE {
  pci-List                   SEQUENCE (SIZE (1..maxNrofPCIsPerSMTC)) OF PhysCellId  OPTIONAL, -- Need M
  periodicity                ENUMERATED {sf5, sf10, sf20, sf40, sf80, spare3, spare2, spare1}
}
```

FIG. 5

| TCI index | Source RS / RS set index | QCL type |
|---|---|---|
| 0 | SS/PBCH block #a | A+D |
| 1 | TRS #b | A |
|  | CSI-RS #c | D |
| ... | ... | ... |
| M-1 | CSI-RS #e | A+D |

RRC configured TCI table

FIG. 6

| DRX cycle | $T_{SSB\_measurement\_period\_intra}$ |
|---|---|
| No DRX | max[ 200ms, ceil( 5 x $K_p$) x SMTC period x MSF]$^{Note\ 1}$ |
| DRX cycle≤ 320ms | max[ 200ms, ceil(1.5x 5 x $K_p$) x max(SMTC period,DRX cycle) x MSF ] |
| DRX cycle>320ms | ceil( 5 x $K_p$ ) x DRX cycle x MSF |
| NOTE 1: If different SMTC periodicities are configured for different cells, the SMTC period in the requirement is the one used by the cell being identified ||

FIG. 9

| DRX cycle | $T_{SSB\_measurement\_period\_intra}$ |
|---|---|
| No DRX | max[ 400ms, ceil($M_{meas\_period\_w/o\_gaps}$ x $K_p$ x $K_{RLM}$) x SMTC period]$^{Note\ 1}$ |
| DRX cycle≤ 320ms | max[ 400ms, ceil(1.5x $M_{meas\_period\_w/o\_gaps}$ x $K_p$ x $K_{RLM}$) x max(SMTC period,DRX cycle)] |
| DRX cycle>320ms | ceil($M_{meas\_period\_w/o\_gaps}$ x$K_p$ x $K_{RLM}$ ) x DRX cycle |
| NOTE 1: If different SMTC periodicities are configured for different cells, the SMTC period in the requirement is the one used by the cell being identified ||

FIG. 10

| Antenna Panel/UE RX beam for RX measurements (TCI state association) | TCI State Association (PDCCH beam) | Measurement Scaling factor for RRM measurements *MSF* | $T_{SSB\_measurement\_period\_intra\_low\_mobility}$ |
|---|---|---|---|
| 1 | CORESET-1 (active PDCCH TCI State#) | *MSF* =1 no scaling<br><br>The value for T $_{SSB\_measurement\_period\_intra}$ in table 1 is used or calculated as indicated -> | max[ 400ms, ceil(1.5x $M_{meas\_period\_w/o\_gaps}$ x $K_p$ x $K_{RLM}$) x max(SMTC period,DRX cycle) x MSF] |
| 2 | No association | *MSF* =K (K times scaling) | max[ 400ms, ceil(1.5x $M_{meas\_period\_w/o\_gaps}$ x $K_p$ x $K_{RLM}$) x max(SMTC period,DRX cycle) x MSF] |
| 3 | No association | *MSF* =K (K times scaling) | max[ 400ms, ceil(1.5x $M_{meas\_period\_w/o\_gaps}$ x $K_p$ x $K_{RLM}$) x max(SMTC period,DRX cycle) x MSF] |
| 4 | No association | *MSF* =K (K times scaling) | max[ 400ms, ceil(1.5x $M_{meas\_period\_w/o\_gaps}$ x $K_p$ x $K_{RLM}$) x max(SMTC period,DRX cycle) x MSF] |

FIG. 11

1310: determining a mobility or measurement adaptation state of a user equipment, wherein the determining is based on one of:

1320: a new transmission configuration indication state for physical downlink control channel for at least one control resource set is configured, user equipment rotational activity exceeds specific threshold limit of a threshold associated with a mobility parameter by X degrees after network indicates user equipment to be in low mobility or measurement adaptation state, user equipment activates new panel due to signal quality degradation, or a threshold condition of the mobility parameter is applied 1330: in response to the determining, scaling or relaxing at least one of a radio resource management measurement period or a threshold condition of the mobility parameter

FIG. 13

METHOD FOR ADAPTING UE RRM MEASUREMENTS FOR POWER SAVING

RELATED APPLICATION

This application was originally filed as PCT Application No. PCT/FI2019/050745, filed on Oct. 22, 2019, which claims priority from U.S. Provisional Application No. 62/755,003, filed on Nov. 2, 2018, each of which is incorporated herein by reference in its entirety.

TECHNICAL FIELD

This invention relates generally to user equipment power saving due to relaxed RRM measurement periods and, more specifically, relates to further energy saving by adapting RRM measurements when the mobility state of user equipment can be estimated or considered as low or stationary.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Abbreviations that may be found in the specification and/or the drawing figures are defined below, at the beginning of the detailed description section.

RAN1 has agreed to study techniques to reduce UE power consumption. In one aspect of RP-181463 "Study on UE Power Saving in NR", CATT et al, June 2018, UE power consumption reduction techniques were discussed with respect to the RRM measurements. Currently, NR Rel15 baseline defines set of features for relaxing the UE RRM measurements in DRX but the relaxation does not consider UE mobility state/speed for scaling RRM.

Nonetheless, a UE also consumes a lot of power for RRM measurements.

With respect to measurement periods and cell detection requirements for intra frequency measurements, currently UE measurement period requirements are scaled in DRX based on the DRX configuration (DRX cycle length). The tables in FIG. 1 and FIG. 2 describe the measurement periods for intra frequency measurements without measurements gaps with different DRX cycle length for SSB based RRM. When the measurement gaps are not overlapping with SMTC periods, the Kp=1 value is used. Measurement periods for intra frequency measurements without gaps (Frequency FR1) are shown in FIG. 1. For FR2 when RLM-RS outside measurement gap is fully overlapping with intra-frequency $S_{MTC}$, $K_{RLM}$=1.5, otherwise $K_{RLM}$=1. Measurement periods for intrafrequency measurements without gaps (Frequency FR2) are shown in FIG. 2.

For cell detection see also the tables in FIG. 3 and FIG. 4 with the relaxation in DRX for FR1 and FR2 (Frequency range), where FIG. 3 shows the time period for PSS/SSS detection (Frequency range FR1) and FIG. 4 shows the time period for PSS/SSS detection (Frequency range FR2).

The SMTC (SS/PBCH Block Measurement Timing Configuration) window defines the time duration and periodicity for SSB based RRM measurements. A UE can be given an SMTC window for IDLE mode measurements (smtc) as well as for the CONNECTED mode with two separate configurations (smtc1, smtc2).

Regarding SMTC/SMTC1, as the primary measurement timing configuration, it indicates the periodicity and offset value for the SMTC window as well as the duration in subframes. Regarding STMC2, as the secondary measurement timing configuration for SSBs, it corresponds to specific PCIs listed in the configuration. For the SSBs indicated in the smtc1, the second/alternative periodicity is indicated by periodicity in smtc2. Periodicity in smtc2 can only be set to a value shorter than the periodicity of the smtc1. For example, if the smtc1 periodicity is configured as sf10, then the periodicity of smtc2 can only be set to sf5. Smtc2 uses the offset and duration value of smtc1. FIG. 5 is illustrative.

Regarding NR Measurement configuration, in NR, a UE may be configured to perform RRM or in more general mobility measurements for inter-cell mobility referred typically as RRM measurements, (Radio Resource Management measurement) or Layer 3 mobility as RRC, Radio resource Control, signaling is involved as well as on intra-cell mobility (referred typically as beam management) on SS/PBCH Block, or simply SSB, and CSI-RS signals. Signals used for either L3 mobility or beam management are explicitly configured.

For beam management purposes and L3 mobility purposes the CSI-RS signals are separately configured i.e. the actual signals, measurements and reporting configurations are of different configuration. For beam management purposes UE is configured with NZP-CSI-RS (non-zero-power) and for L3 mobility purposes UE is configured with CSI-RS for Mobility.

The SSB signals can be used for both beam management and L3 mobility measurement purposes with the difference that for beam management the SSB for measuring and reporting L1-RSRP are explicitly configured and in current specifications it concerns only the serving cell SSBs whereas for L3 mobility purposes the SMTC window determines the time duration and to-be-measured SSB time locations where UE measurements SSBs of all cells in the frequency layer.

Regarding TCI (Transmission Configuration Indication) Framework in NR, in downlink a so-called TCI framework is defined to provide information about TX beams to be used (and correspondingly assist UE to set its receive beam properly when receiving the downlink transmission). A UE may be configured with one or multiple TCI states where each TCI state at above 6 GHz has an associated reference signal which provides QCL type-D parameter. QCL type-D is defined to provide spatial domain characteristics of the RS (i.e. if reference signals share the type-D QCL properties, UE may assume that it can receive signals with same RX beam). The associated reference signal can be SS/PBCH block or CSI-RS. For PDCCH, the UE can have one active TCI state per CORESET (UE can be configured up to 3 CORESETs) and for PDSCH the UE may have up to 8 active TCI states representing 8 candidate beams from which the gNB can select one dynamically via DCI for the scheduled DL transmission. Different TCI states may represent TX beams of different TRPs of the cell.

In summary, following QCL types are defined as follows:
QCL types A: Doppler shift, Doppler spread, average delay, delay spread;
QCL types B: Doppler shift, Doppler spread;
QCL types C: average delay, Doppler shift; and
QCL types D: Spatial Rx.

As an example, an illustration of a TCI Table configuration for a target RS e.g. PDCCH DMRS or PDSCH DMRS is provided in the FIG. 6.

The current invention moves beyond current techniques and considers details not covered by the indicated prior art.

BRIEF SUMMARY

Although the RRM measurement periods are relaxed in the DRX mode (as indicated in the previous section), further energy saving potential are available, especially when a UE mobility state can be estimated as or considered to be low or stationary.

The techniques described herein include a method where it is determined whether a DRX cycle is larger than a DRX cycle threshold. Then the mobility state of a user equipment is determined, where that determination is based on one of a new TCI state for PDCCH for at least one of the CORE-SETs is configured, UE rotational activity exceeds specific threshold limit i.e. X degrees after network indicates UE to be in low mobility state, and/or UE activates new panel due to signal quality degradation, or an applied threshold condition of the mobility. Finally, in response to these determinations, the RRM measurement period is scaled.

Furthermore, when a UE is using RX beamforming, the antenna panels may consume considerable amount of energy when they need to be activated for RRM measurements although in specific cases UE could opportunistically perform less measurements without compromising mobility performance.

This section is intended to include examples and is not intended to be limiting.

SUMMARY OVERVIEW

In an example aspect of the invention, there is a method comprising: determining a mobility or measurement adaptation state of a user equipment, wherein the determining is based on one of: a new transmission configuration indication state for physical downlink control channel for at least one control resource set is configured, user equipment rotational activity exceeds specific threshold limit of a threshold associated with a mobility parameter by X degrees after network indicates user equipment to be in low mobility or measurement adaptation state, user equipment activates new panel due to signal quality degradation, or a threshold condition of the mobility parameter is applied; and in response to the determining, scaling or relaxing at least one of a radio resource management measurement period or a threshold condition of the mobility parameter.

A further example embodiment is a method comprising the method of the previous paragraph, wherein the user equipment determines the mobility or measurement adaptation state of the user equipment, or wherein the network indicates to user equipment whether the user equipment is in stationary or low mobility or measurement adaptation state; wherein the at least one of scaling of relaxing the threshold condition of the mobility parameter comprises scaling or relaxing threshold values of a threshold mobility value associated with at least one of velocity, satellite positioning, LTE/NR positioning, or wifi positioning that is compared to a specific threshold value; wherein the at least one of scaling or relaxing the radio resource management measurements comprises: if discontinuous reception is used, the user equipment may apply extended relaxation for radio resource management measurements for measurements performed in non-active time; and if receiver beamforming is used, the scaling is applied per antenna panel/beam used for radio resource management measurements; wherein the at least one of scaling or relaxing of radio resource management measurements or a threshold condition of the mobility parameter are applied differently for low mobility and stationary states; wherein there is evaluating a mobility or measurement adaptation state for a user equipment to be low or stationary; and comparing an evaluated mobility or measurement adaptation state to a defined mobility or measurement adaptation state; and in response to the evaluated mobility or measurement adaptation state of the user equipment being within bounds of the defined mobility or measurement adaptation state, at least one of scaling or relaxing of radio resource management measurements; wherein the evaluating comprises ascertaining a discontinuous reception cycle length of the user equipment, wherein the defined mobility or measurement adaptation state is a discontinuous reception cycle threshold; wherein the comparing comprises determining the discontinuous reception cycle length of the user equipment with the discontinuous reception cycle threshold; and wherein being within the bounds comprises determining the discontinuous reception cycle length of the user equipment to be greater than the discontinuous reception cycle threshold; wherein the discontinuous reception cycle threshold is predefined and/or signaled to the user equipment by the network; wherein the comparing the evaluated mobility or measurement adaptation state comprises: starting a timer upon the user equipment evaluating the mobility or measurement adaptation state to be low or stationary; and comparing a measured mobility parameter to the threshold mobility value, wherein being within the bounds comprises: determining the measured mobility parameter to be one of above or below the threshold mobility value for the duration of the timer (until it expires); wherein the threshold mobility value is predefined and/or signaled to the user equipment by the network; wherein if the measured mobility parameter is above specific threshold then the user equipment is allowed to relax radio resource management measurements, or if measured mobility parameter is below specific threshold, then the user equipment is considered to be in the evaluated mobility state for the at least one of scaling or relaxing the radio resource management measurements; wherein the measured mobility parameter is based on at least one of: velocity of the user equipment, a number of handover/physical downlink control channel beam change, number of beam change, or a coverage of a specific beam or set of beams; wherein radio resource management for the mobility or measurement adaptation state comprises adaptation reporting of measurements in addition to or alternative to the at least one of scaling or relaxing of radio resource management measurements; wherein the evaluating the mobility or measurement adaptation state to be low or stationary comprises, in response to a network indicating to the user equipment that the network evaluated the user equipment as being in RRC CONNECTED mode, judging the user equipment, from network perspective, to explicitly be in a low or a stationary mobility or measurement adaptation state; wherein the comparing the evaluated mobility or measurement adaptation state comprises: the user equipment exiting a low or a stationary mobility or measurement adaptation state upon one of: a new transmission configuration indication state for physical downlink control channel for at least one control resource set is configured; the user equipment rotational activity exceeds a specific threshold limit; the user equipment activates a new panel due to signal quality degradation; and determining change in mobility or measurement adaptation state; and wherein the user equipment continuously evaluates the mobility state by restarting a T1_mobility_state_radio resource management timer and evaluating the measured mobility parameter against the mobility parameter threshold; and wherein when a condition does not apply, then the UE cannot use the scaling for RRM measurements for the evaluated condition.

In another example aspect of the invention, there is an apparatus, comprising: means for determining a mobility or measurement adaptation state of a user equipment, wherein the determining is based on one of: a new transmission configuration indication state for physical downlink control channel for at least one control resource set is configured, user equipment rotational activity exceeds specific threshold limit of a threshold of a mobility parameter by X degrees after network indicates user equipment to be in low mobility or measurement adaptation state, user equipment activates new panel due to signal quality degradation, or a threshold condition of the mobility parameter is applied; and, means, in response to the determining, for scaling radio resource management measurement period.

A further example embodiment is an apparatus comprising the apparatus of the previous paragraph, wherein the user equipment determines the mobility or measurement adaptation state of the user equipment, or wherein the network indicates to user equipment whether the user equipment is in stationary or low mobility or measurement adaptation state; wherein the at least one of scaling of relaxing the threshold condition of the mobility parameter comprises scaling or relaxing threshold values of a threshold mobility value associated with at least one of velocity, satellite positioning, LTE/NR positioning, or wifi positioning that is compared to a specific threshold value; wherein the at least one of scaling or relaxing of radio resource management measurements comprises: if discontinuous reception is used, the user equipment may apply extended relaxation for radio resource management measurements for measurements performed in non-active time; and if receiver beamforming is used, the scaling is applied per antenna panel/beam used for radio resource management measurements; wherein the at least one of scaling or relaxing of radio resource management measurements are applied differently for low mobility and stationary states; wherein there is means for evaluating a mobility or measurement adaptation state for a user equipment to be low or stationary; comparison of the evaluated mobility or measurement adaptation state to a defined mobility or measurement adaptation state; and means, in response to the evaluated mobility or measurement adaptation state of the user equipment being within bounds of the defined mobility or measurement adaptation state, for at least one of scaling or relaxing of radio resource management measurements; wherein the evaluating comprises ascertaining a discontinuous reception cycle length of the user equipment, wherein the defined mobility or measurement adaptation state is a discontinuous reception cycle threshold; wherein the comparing comprises determining the discontinuous reception cycle length of the user equipment with the discontinuous reception cycle threshold; and wherein being within the bounds comprises determining the discontinuous reception cycle length of the user equipment to be greater than the discontinuous reception cycle threshold; wherein the discontinuous reception cycle threshold is predefined and/or signaled to the user equipment by the network; wherein the comparing comprises: starting a timer upon the user equipment evaluating the mobility or measurement adaptation state to be low or stationary; and comparing a measured mobility parameter to a threshold mobility value, wherein being within the bounds comprises: determining the measured mobility parameter to be below the threshold mobility value for the duration of the timer (until it expires); wherein if the measured mobility parameter is above specific threshold then the user equipment is allowed to relax radio resource management measurements, or if measured mobility parameter is below specific threshold, then the user equipment is considered to be in the evaluated mobility state for the at least one of scaling or relaxing the radio resource management measurements; wherein the measured mobility parameter is based on at least one of: velocity of the user equipment, a number of handover/physical downlink control channel beam change, or a coverage of a specific beam or set of beams; wherein radio resource management for the mobility or measurement adaptation state comprises adaptation reporting of measurements in addition to or alternative to the at least one of scaling or relaxing of radio resource management measurements; wherein the threshold mobility value is predefined and/or signaled to the user equipment by the network; wherein the evaluating the mobility or measurement adaptation state for a user equipment to be low or stationary comprises, in response to a network indicating to the user equipment that the network evaluated the user equipment as being in RRC CONNECTED mode, judging the user equipment, from network perspective, to explicitly be in a low or a stationary mobility or measurement adaptation state; wherein the comparing the evaluated mobility or measurement adaptation state comprises: the user equipment exiting a low or a stationary mobility or measurement adaptation state upon one of the following conditions being met: a new transmission configuration indication state for physical downlink control channel for at least one control resource set is configured; UE rotational activity exceeds a specific threshold limit; and the user equipment activates a new panel due to signal quality degradation or an applied threshold condition of the mobility parameter; determining change in mobility or measurement adaptation state; and wherein the user equipment continuously evaluates the mobility state by restarting a T1_mobility_state_radio resource management timer and evaluating the measured mobility parameter against the mobility parameter threshold; and wherein when a condition does not apply, then the UE cannot use the scaling for RRM measurements for the evaluated condition.

In still another example aspect of the invention, there is an apparatus, such as a network side apparatus, comprising: at least one processor; and at least one memory including computer program code, where the at least one memory and the computer program code are configured, with the at least one processor, to cause the apparatus to at least: determine a mobility or measurement adaptation state of a user equipment, wherein the determining is based on one of: a new transmission configuration indication state for physical downlink control channel for at least one control resource set is configured, user equipment rotational activity exceeds specific threshold limit of a threshold associated with a mobility parameter by X degrees after network indicates user equipment to be in low mobility or measurement adaptation state, user equipment activates new panel due to signal quality degradation, or a threshold condition of the mobility parameter is applied; and, in response to the determining, at least one of scale or relax a radio resource management measurement period, or a threshold condition of the mobility parameter.

A further example embodiment is an apparatus comprising the apparatus of the previous paragraph, wherein the user equipment determines the mobility or measurement adaptation state of the user equipment, or wherein the network indicates to user equipment whether the user equipment is in stationary or low mobility or measurement adaptation state; wherein the at least one of scaling of relaxing the threshold condition of the mobility parameter comprises scaling or relaxing threshold values of a threshold mobility value associated with at least one of velocity, satellite positioning, LTE/NR positioning, or wifi positioning that is compared to a specific threshold value; wherein the at least one of scaling or relaxing the radio resource management measurements comprises: if discontinuous reception is used, the user equipment may apply extended relaxation for radio resource management measurements for measurements performed in non-active time; and if receiver beamforming is used, the scaling is applied per antenna panel/beam used for radio resource management measurements; wherein the at least one of scaling or relaxing of radio resource management measurements or a threshold condition of the mobility parameter are applied differently for low mobility and stationary states; wherein there is evaluating a mobility or measurement adaptation state for a user equipment to be low or stationary; and comparing an evaluated mobility or measurement adaptation state to a defined mobility or measurement adaptation state; and in response to the evaluated mobility or measurement adaptation state of the user equipment being within bounds of the defined mobility or measurement adaptation state, at least one of scaling or relaxing of radio resource management measurements; wherein the evaluating comprises ascertaining a discontinuous reception cycle length of the user equipment, wherein the defined mobility or measurement adaptation state is a discontinuous reception cycle threshold; wherein the comparing comprises determining the discontinuous reception cycle length of the user equipment with the discontinuous reception cycle threshold; and wherein being within the bounds comprises determining the discontinuous reception cycle length of the user equipment to be greater than the discontinuous reception cycle threshold; wherein the discontinuous reception cycle threshold is predefined and/or signaled to the user equipment by the network; wherein the comparing the evaluated mobility or measurement adaptation state comprises: starting a timer upon the user equipment evaluating the mobility or measurement adaptation state to be low or stationary; and comparing a measured mobility parameter to the threshold mobility value, wherein being within the bounds comprises: determining the measured mobility parameter to be one of above or below the threshold mobility value for the duration of the timer (until it expires); wherein the threshold mobility value is predefined and/or signaled to the user equipment by the network; wherein if the measured mobility parameter is above specific threshold then the user equipment is allowed to relax radio resource management measurements, or if measured mobility parameter is below specific threshold, then the user equipment is considered to be in the evaluated mobility state for the at least one of scaling or relaxing the radio resource management measurements; wherein the measured mobility parameter is based on at least one of: velocity of the user equipment, a number of handover/physical downlink control channel beam change, number of beam change, or a coverage of a specific beam or set of beams; wherein radio resource management for the mobility or measurement adaptation state comprises adaptation reporting of measurements in addition to or alternative to the at least one of scaling or relaxing of radio resource management measurements; wherein the evaluating the mobility or measurement adaptation state to be low or stationary comprises, in response to a network indicating to the user equipment that the network evaluated the user equipment as being in RRC CONNECTED mode, judging the user equipment, from network perspective, to explicitly be in a low or a stationary mobility or measurement adaptation state; wherein the comparing the evaluated mobility or measurement adaptation state comprises: the user equipment exiting a low or a stationary mobility or measurement adaptation state upon one of: a new transmission configuration indication state for physical downlink control channel for at least one control resource set is configured; the user equipment rotational activity exceeds a specific threshold limit; the user equipment activates a new panel due to signal quality degradation or an applied threshold condition of the mobility parameter; and determining change in mobility or measurement adaptation state; and wherein the user equipment continuously evaluates the mobility state by restarting a T1_mobility_state_radio resource management timer and evaluating the measured mobility parameter against the mobility parameter threshold; and wherein when a condition does not apply, then the UE cannot use the scaling for RRM measurements for the evaluated condition.

BRIEF DESCRIPTION OF THE DRAWINGS

In the attached Drawing Figures:

FIG. 1 is a table of measurement period for intrafrequency measurements without gaps (Frequency FR1);

FIG. 2 is a table of measurement period for intrafrequency measurements without gaps (Frequency FR2);

FIG. 3 is a table of time period for PSS/SSS detection (Frequency range FR1);

FIG. 4 is a table of time period for PSS/SSS detection (Frequency range FR2);

FIG. 5 is a computer algorithm for an SMTC window (SS/PBCH Block Measurement Timing Configuration);

FIG. 6 is an illustration of a TCI Table configuration for a target RS;

FIG. 9 is a table of DRX cycle<=320 ms, DRX cycle length>N ms and UE in low/stationary mobility state, where a single panel UE or Panel specific scaling is not applied;

FIG. 10 is a table of DRX cycle<=320 ms, DRX cycle length>N ms and UE in low/stationary mobility state, multi panel UE;

FIG. 11 is a table illustrating scaling for the RRM measurement periods;

FIG. 13 shows another method in accordance with example embodiments of the invention which may be performed by an apparatus.

DETAILED DESCRIPTION OF THE DRAWINGS

Figure 7:
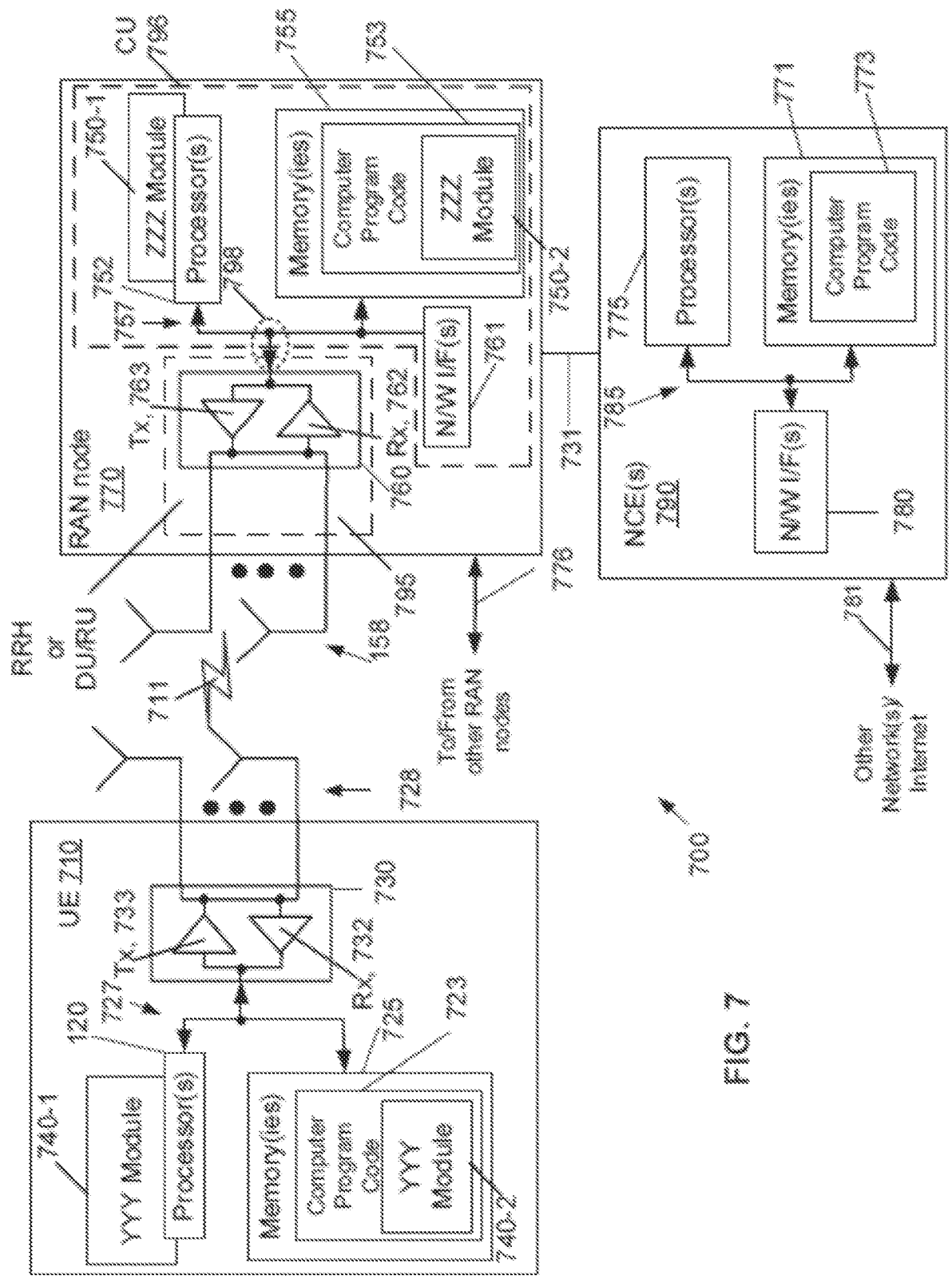
FIG. 7 is a block diagram of one possible and non-limiting exemplary system in which the exemplary embodiments may be practiced.

The following abbreviations that may be found in the specification and/or the drawing figures are defined as follows:
3GPP Third Generation Partnership project
5G Fifth Generation
5GC 5G Core Network
AMF Access and Mobility management Function CORESET Control Resource Set
CU Central Unit
CU-UP Central Unit User Plane
DRX Discontinuous Reception
DU Distributed Unit
eNB (or eNodeB) evolved Node B (e.g., an LTE base station)
gNB (or gNodeB) base station for 5G/NR, i.e., a node providing NR user plane and control plane protocol terminations towards the UE, and connected via the NG interface to the 5GC
EN-DC E-UTRA-NR dual connectivity
en-gNB or En-gNB node providing NR user plane and control plane protocol terminations towards the UE, and acting as secondary node in EN-DC
E-UTRA evolved Universal Terrestrial Radio Access, i.e., the LTE radio access technology
FR1 Frequency Range 1
FR2 Frequency Range 2
I/F Interface
LTE Long Term Evolution
MAC Medium Access Control
MME Mobility Management Entity
NCE Network Control Element
ng or NG New Generation
ng-eNB or NG-eNB new generation eNB
NR New Radio
N/W or NW Network
PDCP Packet Data Convergence Protocol
PHY Physical Layer
RAN Radio Access Network
Rel Release
RLC Radio Link Control
RRC Radio Resource Control
RRH Remote Radio Head
RRM Radio Resource Management
RU Radio Unit
Rx Receiver
SDAP Service Data Adaptation Protocol
SGW Serving Gateway
SMF Session Management Function
SMTC SSB Measurement Timing Configuration
SSB SS/PBCH Block
TCI Transmission Configuration Indication
TS Technical Specification
Tx Transmitter
TRP Transmission Reception Point
UE User Equipment (e.g., a wireless, typically mobile device)
UPF User Plane Function The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for adapting UE RRM measurements to save power.

A UE also consumes a lot of power for RRM measurements. In particular, a UE would need to power up before the DRX ON period to track the channel in preparation for the RRM measurement. Some of the RRM measurements are not necessary but consume a lot of UE power, for example, the low mobility UEs do not have to measure as frequently as high mobility UEs. The network would provide the signaling to assist the UE to reduce the power consumption on unnecessary RRM measurements. Additional UE assistance, for example the UE status information, etc., is also useful for the network to enable the UE power consumption reduction on RRM measurements.

The current invention identifies the feasibility and benefit of techniques to allow UE implementations which can operate with reduced power consumption.

In various embodiments UE is referred to be in low or stationary mobility state to trigger actions which should be seen in non-limiting manner i.e. in general view any trigger when preconfigured, evaluated by UE or triggered by network could be used to apply the RRM/beam management measurement adaptation described herein when conditions are determined so that adaptation can be applied by UE. As an example the condition may herein simply refer to measurement adaptation condition for measurements (RRM, beam management).

If the UE is configured with DRX and DRX cycle in use is longer than N ms (or alternatively equal or larger), and the UE mobility state is determined as low or stationary, then the UE may apply extended relaxation for RRM measurements when measurements are performed in non-active time (when DRX is used). If UE is using RX beamforming, the scaling is applied per antenna panel/beam (all panels, only one panel, or subset of panels or beams) used for RRM measurements.

In any of the embodiment and examples herein, the scaling/adaptation of measurements can be applied for RRM and/or beam management measurements.

Regarding the DRX Cycle Length, in one embodiment the DRX cycle threshold of N ms is predefined or signaled by network (RRC/MAC). For example, a threshold is set to 80 ms. If UE has a DRX cycle length longer than 80 ms, then it may consider the determined mobility state for determining the RRM measurement scaling factor for DRX. If the configured DRX cycle is shorter than configured threshold, then the UE does not apply any scaling/relaxation to RRM measurements regardless of determined mobility state.

When UE is considered to be in low or stationary mobility state it may indicate that UE is stationary, relatively stationary or low velocity UE or its trajectory is within some geographical boundaries. Determining the low/stationary mobility state may also comprise of determining that UE is in the state or condition where it does not need to perform frequent mobility measurements (RRM, beam management) since the subsequent measurements would have high correlation i.e. the channel conditions would not change very rapidly (and correspondingly neither the measurement results). Thus it may be considered that UE is in a state where it can adapt measurements for power saving. This may be typical for low mobility UE. The mobility state or state where the measurements are adapted may be determined by UE or by Network. The Network may explicitly signal when UE is considered to be in state for adapting the measurements or network may indicate scaling by indicating change/scaling of measurement parameters. The Network or the UE may determine different states of measurement adaptation where in different states of adaptation different set of parameters may be used to determine scaling of measurements.

Regarding Mobility States and determining the mobility state of a UE, in one embodiment the mobility state is determined to be low or stationary based on expiry of a timer T1_mobility_state_rrm and threshold condition of a mobility parameter. If the evaluated parameter is below the threshold value for the duration of the timer (until it expires), then the UE is considered to be in the evaluated mobility state for scaling/relaxing the RRM measurements.

In one embodiment the mobility state is determined to be low or stationary (or as in any of the embodiment herein, the UE is considered to be in state where measurement adaptation condition applies) based on expiry of a timer T1_mobility_state_rrm and threshold condition of a mobility parameter. Timer T1 is started when UE estimates or measures that it is in low or stationary mobility state. The mobility state is evaluated based on specific threshold value, for instance, a mobility parameter such as velocity (satellite positioning, LTE/NR positioning, Wi-Fi positioning, etc.) is compared to specific threshold value (either configured by network or set in specification). The mobility state can also be based on the number of handover/PDCCH beam (TCI State activation) changes when the timer is running, such as, if UE TCI state for PDCCH does not change (for specific CORESET or any of the CORESETs or it may change only a subset of CORESETS with active TCI States) or if the UE has been under coverage of a specific beam or set of beams (e.g. based on RSRP measurements or estimation of being in the geographical area of a beam coverage). When a TCI state for PDCCH does not change it may indicate that UE is stationary, relatively stationary or low mobile UE or its trajectory is within some geographical boundaries. This may be determined by UE or by Network. Furthermore the TCI state change may be evaluated using the exemplary timers described herein (e.g. active PDCCH TCI State does not change for the duration of a timer).

If the evaluated parameter is below the threshold value for the duration of the timer (until it expires), then a UE is considered to be in the evaluated mobility state for scaling/relaxing the RRM measurements. Hysteresis values may be applied for avoiding ping-pong based triggering of mobility state/timer start/reset operations.

Regarding Panel/UE RX Beam specific relaxation for RRM measurements, in one embodiment of the invention when the proposed condition applies (mobility state, DRX), a UE may apply further relaxation for RRM measurements in panel/UE RX beam specific manner. In some embodiments UE may only evaluate one condition (either mobility state or DRX or measurement adaptation) or evaluate neither and measurement scaling for RRM is indicated by network explicitly. When the conditions are evaluated and when the proposed conditions herein apply, the UE is allowed to apply further relaxation of RRM measurements on antenna panel/RX beam basis used for RRM measurements based on the activated TCI state for PDCCH or the derived cell quality (using all the panels i.e. measuring in normal configuration) or the derived cell quality using subset of antenna panels/beams. When the signal quality (TCI state for PDCCH or cell quality measured using subset of antenna panels/beams) is above specific threshold_RRM_scaling (e.g. RSRP, RSRQ), then the UE is allowed to relax RRM measurements according to methods described herein.

An alternative way for network to indicate scaling per antenna panel is that network only indicates a configuration for panel specific RRM measurement periodic adaptation (or relaxation or scaling) without explicitly indicating UE that it is considered to be in specific mobility state. Network may determine based on various methods that UE could be allowed to relax (measure less frequently) RRM measurements and if beam forming is used the scaling can be indicated per panel or applied on all panels.

When the mobility state in RRC CONNECTED mode is evaluated by network and indicated to UE, the network indicates to the UE explicitly that it is considered from network perspective to be in low or stationary mobility state. The UE may assume low or stationary mobility state as long as following conditions apply: a new TCI state for PDCCH for at least one of the CORESETs is not configured (in other words a PDCCH beam is not changed for UE); the UE rotational activity does not exceed specific threshold limit, such as X degrees after network indicates the UE to be in low mobility state. UE may assume not to be in low/stationary conditions or it cannot apply RRM scaling when UE activates (or it has to activate) a new panel due to signal quality degradation of measurements performed with current active panel or it activates new panel for PDCCH reception (PDCCH TCI state is indicated by network and UE has to activate another panel).

In one aspect of the invention, using any of the method presented herein the document, UE may apply RRM measurement period adaptation/scaling on all panels, one panel or subset of panels.

In one aspect of the invention, the proposed scaling can be applied for L3 mobility measurements (e.g. for all panels, for one panel, or subset of panels) and for beam management measurements or the scaling may only be applied for RRM measurements but not for beam management measurements and vice versa. In another aspect, different scaling may be applied for RRM and beam management measurements.

In one aspect of the invention, the methods described herein may be applied for specific cell or set of cells including intra-frequency, inter-frequency, and carrier aggregation. Cell may be a serving cell (PCell or SCell). Set of cells may include the serving cell and number of cells in a set size may be one or more.

Additional description of these techniques is presented after a system into which the exemplary embodiments may be used is described. Turning to FIG. 7, this figure shows a block diagram of one possible and non-limiting exemplary system in which the exemplary embodiments may be practiced. A user equipment (UE) 710, radio access network (RAN) node 770, and network control element(s) (NCE(s)) 790 are illustrated.

In FIG. 7, a user equipment (UE) 710 is in wireless communication with a wireless network 700. A UE is a wireless, typically mobile device that can access a wireless network. The UE 710 includes one or more processors 720, one or more memories 725, and one or more transceivers 730 interconnected through one or more buses 727. Each of the one or more transceivers 730 includes a receiver, Rx, 732 and a transmitter, Tx, 733. The one or more buses 727 may be address, data, or control buses, and may include any interconnection mechanism, such as a series of lines on a motherboard or integrated circuit, fiber optics or other optical communication equipment, and the like. The one or more transceivers 730 are connected to one or more antennas 728. The one or more memories 725 include computer program code 723. The UE 710 includes a YYY module 740, comprising one of or both parts 740-1 and/or 740-2, which may be implemented in a number of ways. The YYY module 740 may be implemented in hardware as YYY module 740-1, such as being implemented as part of the one or more processors 720. The YYY module 740-1 may be implemented also as an integrated circuit or through other hardware such as a programmable gate array. In another example, the YYY module 740 may be implemented as YYY module 740-2, which is implemented as computer program code 723 and is executed by the one or more processors 720. For instance, the one or more memories 725 and the computer program code 723 may be configured to, with the one or more processors 720, cause the user equipment 710 to perform one or more of the operations as described herein. The UE 710 communicates with RAN node 770 via a wireless link 711.

The RAN node 770 is a base station that provides access by wireless devices such as the UE 710 to the wireless network 700. The RAN node 770 may be, for instance, a base station for 5G, also called New Radio (NR). In 5G, the RAN node 770 may be a NG-RAN node, which is defined as either a gNB or an ng-eNB. A gNB is a node providing NR user plane and control plane protocol terminations towards the UE, and connected via the NG interface to a 5GC (e.g., the NCE(s) 790). The ng-eNB is a node providing E-UTRA user plane and control plane protocol terminations towards the UE, and connected via the NG interface to the 5GC. The NG-RAN node may include multiple gNBs, which may also include "logical" elements, namely a central unit (CU) (gNB-CU) 796 and distributed unit(s) (DUs) (gNB-DUs), of which DU 795 is shown. The CU is a logical node which may include the functions (i.e., gNB functions) such as transfer of user data, mobility control, radio access network sharing, positioning, session management, etc., except those functions allocated exclusively to the DU. The CU may control the operation of DUs over a front-haul (F1) interface. The CU may also be known as BBU/REC/RCC/C-RAN/V-RAN. The DU is a logical node which may include a subset of the functions (i.e., gNB functions), depending on the functional split option. The operation of the DU may be controlled by the CU. The DU may also be known with other names like RRH/RRU/RE/RU. The DU may also contain intra-DU interfaces, e.g. E1 interface between its user and control plane functions. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 798, although reference 798 also illustrates a link between remote elements of the RAN node 770 and centralized elements of the RAN node 770, such as between the gNB-CU 796 and the gNB-DU 795. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 798 connected with the gNB-CU. Note that the DU 795 is considered to include the transceiver 760, e.g., as part of an RU, but some examples of this may have the transceiver 760 as part of a separate RU, e.g., under control of and connected to the DU 795. The RAN node 770 may also be an eNB (evolved NodeB) base station, for LTE (long term evolution), or any other suitable base station.

The RAN node 770 includes one or more processors 752, one or more memories 755, one or more network interfaces (N/W I/F(s)) 761, and one or more transceivers 760 interconnected through one or more buses 757. Each of the one or more transceivers 760 includes a receiver, Rx, 762 and a transmitter, Tx, 763. The one or more transceivers 760 are connected to one or more antennas 758.

The one or more memories 755 include computer program code 753. The CU 796 may include the processor(s) 752, memories 755, and network interfaces 761. Note that the DU 795 may also contain its own memory/memories and processor(s), and/or other hardware, but these are not shown.

The RAN node 770 includes a ZZZ module 750, comprising one of or both parts 750-1 and/or 750-2, which may be implemented in a number of ways. The ZZZ module 750 may be implemented in hardware as ZZZ module 750-1, such as being implemented as part of the one or more processors 752. The ZZZ module 750-1 may be implemented also as an integrated circuit or through other hardware such as a programmable gate array. In another example, the ZZZ module 750 may be implemented as ZZZ module 750-2, which is implemented as computer program code 753 and is executed by the one or more processors 752. For instance, the one or more memories 755 and the computer program code 753 are configured to, with the one or more processors 752, cause the RAN node 770 to perform one or more of the operations as described herein. Note that the functionality of the ZZZ module 750 may be distributed, such as being distributed between the DU 795 and the CU 796, or be implemented solely in the DU 795.

The one or more network interfaces 761 communicate over a network such as via the links 776 and 731. Two or more gNBs 770 communicate using, e.g., link 776. The link 776 may be wired or wireless or both and may implement, e.g., an Xn interface for 5G, an X1 interface for LTE, or other suitable interface for other standards.

The one or more buses 757 may be address, data, or control buses, and may include any interconnection mechanism, such as a series of lines on a motherboard or integrated circuit, fiber optics or other optical communication equipment, wireless channels, and the like. For example, the one or more transceivers 760 may be implemented as a remote radio head (RRH) 795 for LTE or a distributed unit (DU) 795 for gNB implementation for 5G, with the other elements of the RAN node 770 possibly being physically in a different location from the RRH/DU, and the one or more buses 757 could be implemented in part as, e.g., fiber optic cable or other suitable network connection to connect the other elements (e.g., a central unit (CU), gNB-CU) of the RAN node 770 to the RRH/DU 795. Reference 798 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 700 may include a network control element (NCE) (or elements, NCE(s)) 790 that may include core network functionality, and which provides connectivity via a link or links 781 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the NCE(s) 790, and note that both 5G and LTE functions might be supported. The RAN node 770 is coupled via a link 731 to the NCE 790. The link 731 may be implemented as, e.g., an NG interface for 5G, or an Si interface for LTE, or other suitable interface for other standards. The NCE 790 includes one or more processors 775, one or more memories 771, and one or more network interfaces (N/W I/F(s)) 780, interconnected through one or more buses 785. The one or more memories 771 include computer program code 773. The one or more memories 771 and the computer program code 773 are configured to, with the one or more processors 775, cause the NCE 790 to perform one or more operations.

The wireless network 700 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 752 or 775 and memories 755 and 771, and also such virtualized entities create technical effects.

The computer readable memories 725, 755, and 771 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 725, 755, and 771 may be means for performing storage functions. The processors 720, 752, and 775 may be of any type suitable to the local technical environment, and may include one or more of general purpose computers, special purpose computers, microprocessors, digital signal processors (DSPs) and processors based on a multi-core processor architecture, as non-limiting examples. The processors 720, 752, and 775 may be means for performing functions, such as controlling the UE 710, RAN node 770, and other functions as described herein.

In general, the various embodiments of the user equipment 710 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

As noted above, although the RRM measurement periods are relaxed in the DRX mode (as indicated in a previous section), further energy saving potential have been identified herein, especially when UE mobility state can be estimated or considered to be low or stationary. Furthermore, when UE is using RX beamforming, the antenna panels may consume considerable amount of energy when they need to be activated for RRM measurements although in specific cases UE could opportunistically perform less measurements without compromising mobility performance.

Above, different manifestations of the present invention were introduced. Below is more detailed description of determining Mobility State.

Mobility state is determined to be low or stationary based on expiry of a timer T1_mobility_state_rrm and a threshold condition of a mobility parameter.

Timer T1 is started when UE estimates or measures that it is in low or stationary mobility state. The mobility state is evaluated based on specific threshold value, that is a mobility parameter such as velocity (satellite positioning, LTE/NR positioning, Wi-Fi positioning, etc.) is compared to specific threshold value (either configured by network or set in specification). The mobility state is evaluated based on the number of handover/PDCCH beam changes when the timer is running, in other words, if UE TCI state for PDCCH does not change (for specific CORESET or any of the CORESETs). The mobility state is evaluated based on the UE having been under coverage of a specific beam or set of beams (e.g. based on RSRP measurements or estimation of geographical area of a beam). In general terms, if UE has been in the coverage area of specific cell, set of cells or specific beam or set of beams (either SSB or CSI-RS), for the duration of the timer it may assume or assumed by network to be in low or stationary mobility state.

If the evaluated parameter is below a threshold value for the duration of the timer (until it expires), then the UE is considered to be in the evaluated mobility state for scaling/relaxing the RRM measurements. Note that hysteresis values may be applied for avoiding a ping-pong based triggering of mobility state/timer start/reset operations.

Another manifestation of UE mobility involves a low movement or stationary state or stating that UE is in a state where it is allowed to adapt measurements.

In one embodiment, separate thresholds can be configured for determining low mobility and stationary states. In other words, a UE can be considered to be in low mobility state when the velocity does not exceed the threshold value mobility_state_low_rrm but is not considered to be stationary since the velocity was not below threshold value mobility_state_stationary_rrm. The UE may apply different scaling/relaxation for RRM measurements in low mobility and stationary states that is for a stationary case the relaxation factor may be larger than for low mobility. Similarly, the same threshold types can be applied for number of beam changes and/or the UE staying under coverage of a beam or set of beams for the duration of T1.

In one embodiment, the UE may continuously evaluate the mobility state by restarting the T1_mobility_state_rrm timer and evaluating the mobility parameters against the mobility_state thresholds. When a condition does not apply, then the UE cannot use the scaling for RRM measurements for the evaluated condition.

In one embodiment, the mobility state may additionally include an evaluation of UE rotational activity, that is the UE may be stationary but rotates more than mobility_state_rotational_rrm (e.g. in degrees).

In one embodiment in accordance with the example embodiments, the measurement adaptation may also comprise of determining measurement frequency/bandwidth information. As an example, specific adaptation may include adapting the used bandwidth for RRM or beam management measurements. These adaptations may be coupled with any other adaptation mechanisms applied for measurements including the methods described herein the invention. An adaptation may also comprise determining alternative center frequency or frequency location for the measurements.

Regarding exiting the Mobility State/measurement adaptation condition indicated by network (or determined by UE), when the mobility state in RRC CONNECTED mode is evaluated by the network and indicated to the UE (or determined by UE itself), in this case the network indicates explicitly that the UE is considered from network perspective to be in low or stationary mobility state, then the UE may assume to exit the low or stationary mobility state or measurement adaptation state or even change the adaptation state or mobility state to another when specific conditions are met. These may be but are not limited to the new TCI state for PDCCH for at least one of the CORESETs is configured; or the UE rotational activity exceeds a specific threshold limit (i.e. X degrees after network indicates UE to be in low mobility state); or the UE activates a new panel due to signal quality degradation or activates new panel for PDCCH or PDSCH reception or UE velocity/speed changes according to any method or the described methods herein. In one example if a new TCI state is activated for PDCCH or PDSCH but UE does not need to activate/use different panel due to activation UE may assume that the low/stationary mobility/measurement adaptation condition applies.

Regarding RRM and Beam Management aspects, in one aspect of the invention, the proposed scaling can be applied for L3 mobility measurements (RRM) and for beam management measurements or the scaling may only be applied for RRM measurements but not for beam management measurements and vice versa. As a non-limiting example if UE adapts measurements for RRM based on mobility/adaptation state i.e. it applied scaling on panel basis (all, one, a subset) UE may adapt beam management measurements in different manner i.e. applying adaptation to set of panels. In one example the beam management measurements may be relaxed for panels that are not associated with active TCI state for PDCCH reception. Or in case it is determined that only one of the multiple active TCI States are actively used (i.e. other TCI States may be active but in dormant state and not used at the moment) UE may determine which panels to adapt for beam management measurements (or RRM/L3 Mobility). It may be also determined that same panels are adapted for both RRM and beam management. One example of adaptation may be that the panels can be deactivated from RRM or beam management measurement perspective e.g. UE is not required to use the panels for RRM or beam management measurements.

In one further aspect of the invention the measurement adaptation of RRM or beam management measurements (based on methods described herein e.g. mobility state/measurement adaptation state) may also include adaptation reporting of measurements (this may be additional or alternative to measurement scaling i.e. only reporting is scaled, measurements are scaled, or both). UE may be configured to perform periodical reporting of measurements on such as SSB or CSI-RS for beam management or SSB and CSI-RS for L3 mobility. These measurements may be reported using PUCCH (Physical Uplink Control Channel), PUSCH (Physical Uplink Shared Channel), MAC CE (MAC Control Element), RRC (Radio Resource Control) signaling. The adaptation of reporting may comprise of performing less frequent reporting of measurements when UE is considered to be in specific state. As an example, if UE is configured with reporting period of N ms UE may be providing periodical reports only every SF*N ms, where the SF is a scaling factor. As an example, if UE reports measurements (as rate configured by network) every 20 ms and SF=2 is applied, UE reports measurements every 40 ms. Reporting less frequently may enable energy saving at UE. In one example the network configures the scaling factor or it is predefined or derived by UE based on other information. Network may be aware explicitly that UE is adapting the reporting period (e.g. it knows UE state or has explicitly indicated the scaling to be applied) or it may implicitly determine when UE does not transmit reports on specific intervals. Reporting may also be panel specific i.e. UE would not need to provide reporting on measurements specific panels or the reporting period is scaled. Adapting may also comprise of determining that only subset of configured SSB/CSI-RS signals are monitored for reporting. In one example UE reporting may be adapted so that it would report less than N beams, where N is the configured maximum number of beams to be reported in normal reporting without adaptation.

In another aspect, different scaling may be applied for RRM and beam management measurements. The UE is allowed a measure for beam management purposes with a subset of panels/beams in good channel conditions and when DRX and mobility state criteria are fulfilled.

In a further aspect of the invention, when the proposed condition applies (mobility state, DRX or either one, or none of the mobility state or DRX but due to explicit indication by network or merely a signal quality threshold is used), then the UE may apply further relaxation for RRM measurements in panel/UE Rx beam specific manner; in other words when the proposed conditions herein apply, then the UE is allowed to apply further relaxation of RRM measurements on antenna panel basis. Antenna panels/beams that are not used for monitoring PDCCH on any of the activated TCI states in any of the CORESETs in DRX operation can be considered for further relaxation for RRM measurements. Or, if the UE is indicated that specific CORESETs is monitored with specific TCI state in DRX, then the UE beam/panel is not considered for relaxing RRM measurements or beam management measurements. Additionally or alternatively, the signal quality of the activated TCI state for PDCCH (or multiple PDCCH TCI states) may be used to determine whether the beam specific scaling can be applied. For instance, when the signal quality is above specific threshold_RRM_scaling (e.g. RSRP, RSRQ), the UE is allowed to relax RRM measurements according to methods described herein. In another example all the TCI states for PDCCH have to be above threshold or at least one has to be above threshold.

Alternatively, all panels can be considered for relaxing/adapting RRM measurements and subset of panels not used for PDCCH monitoring/PDSCH reception can be considered for adapting beam management measurements. In more general view for subset of panels the measurement period scaling is applied and for subset the scaling is applied.

Figure 8:
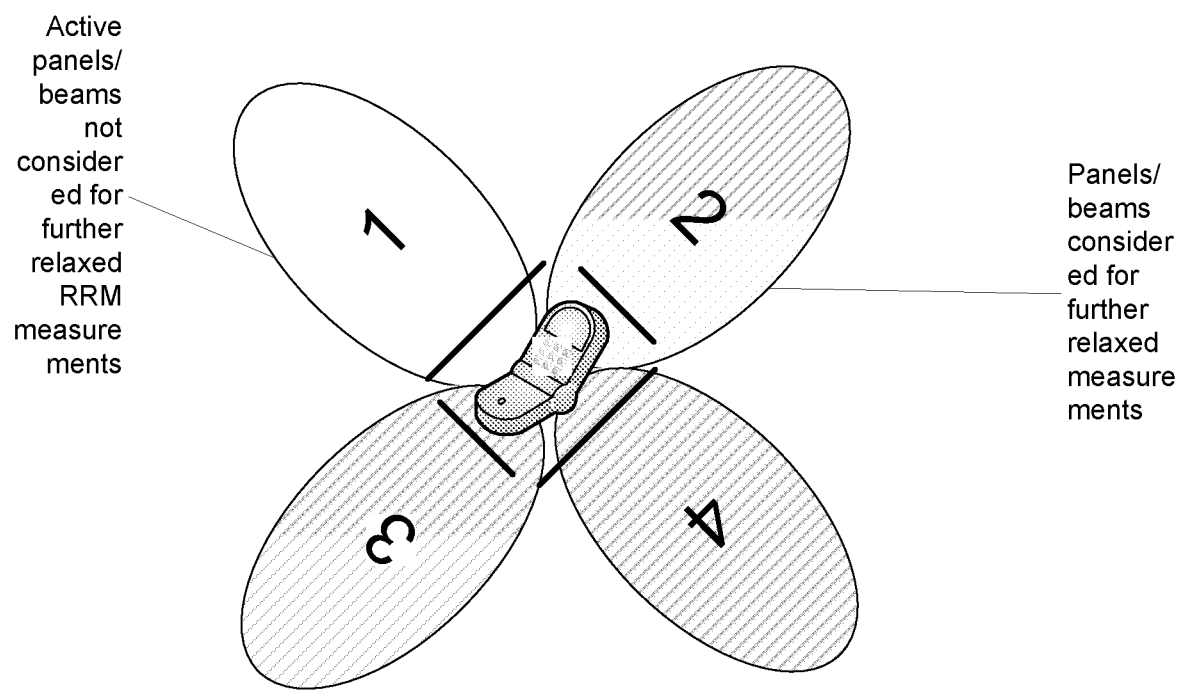
FIG. 8 is an illustration of panels considered/not considered for further relaxed RRM measurements.

FIG. 8 is an illustration of panels considered/not considered for further relaxed RRM measurements as an example of applying the relaxed RRM measurement period for SSB based RRM measurements on antennal panel basis or the set of RX beams used for RRM measurements. In FIG. 9, the table shows that a UE may assumed to be omni UE (i.e. RX beam forming is not used) or that the UE can use similar scaling for all the antenna panels or beam used for RRM measurements or alternatively beam management measurements, or only RRM measurements but not beam management measurements. In FIG. 10, the table illustrates the measurement period scaling on antenna panel basis where measurements for antenna panel 1 are not additionally scaled whereas the panels 2, 3, and 4 can be switched off for an extended duration due to more relaxed measurement periods for RRM. In the table in FIG. 10, only the DRX cycle<=320 ms is illustrated.

In one aspect of the invention in any of the described aspects the antenna panel/beam specific scaling may be applied in a manner where each panel/beam has a specific scaling factor.

As can be seen from FIG. 11, scaling for the RRM measurement periods is applied by multiplying the right hand part of the T SSB_measurement_period_intra equation with the scaling factor MSF (Measurement Scaling Factor), where the value of MSF=2 allows two times more relaxed scaling when applied, and a value of MSF=2.5 means two and half times more relaxed scaling when applied, and so on. Note that in some cases DRX or mobility state are not used as scaling factor but merely a network indication that "scaling can be applied".

Figure 12:
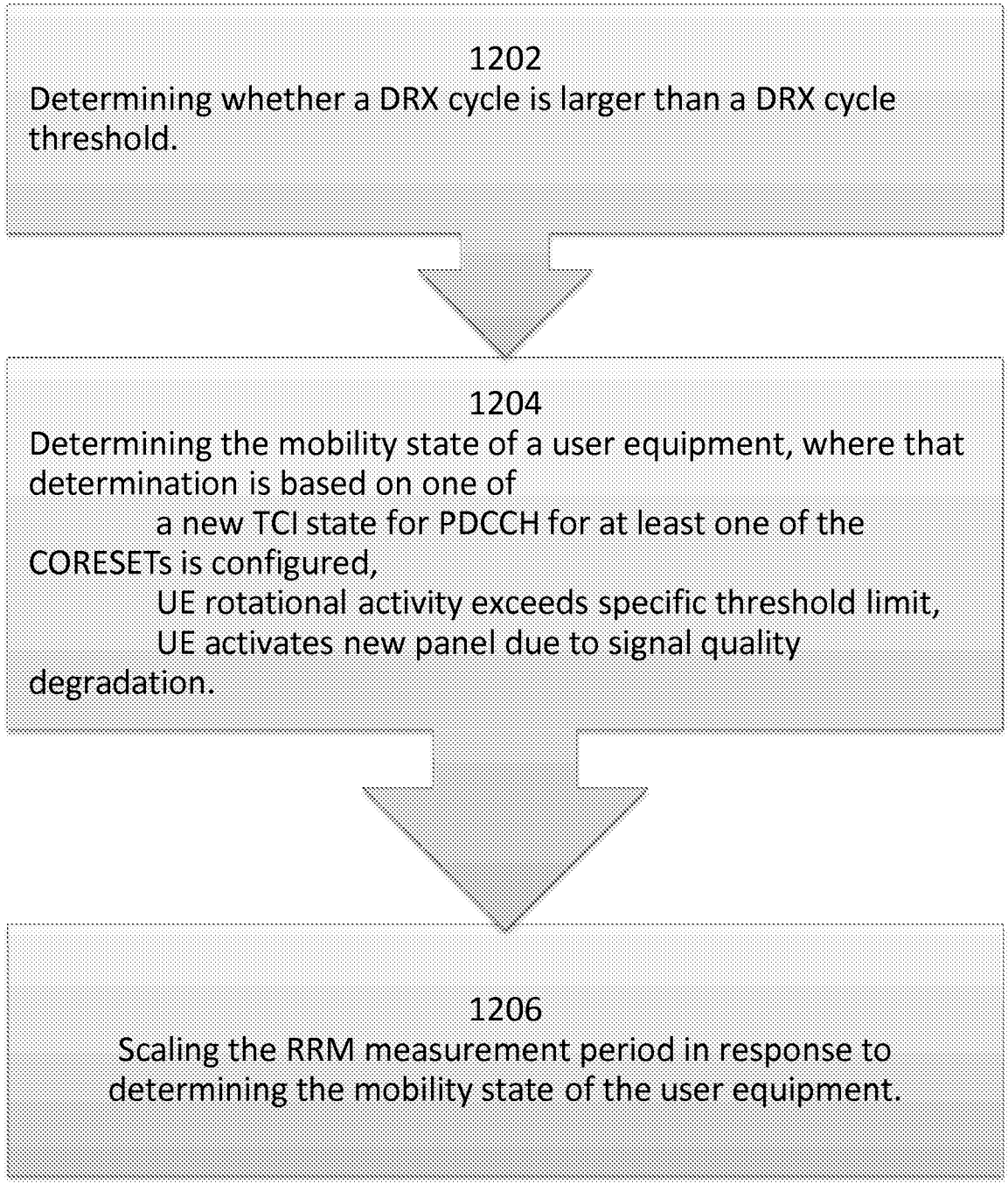
FIG. 12 is a logic flow diagram for adapting UE RRM measurements for power saving and illustrates the operation of an exemplary method or methods, a result of execution of computer program instructions embodied on a computer readable memory, functions performed by logic implemented in hardware, and/or interconnected means for performing functions in accordance with exemplary embodiments.

FIG. 12 is a logic flow diagram for adapting UE RRM measurements for power saving. This figure further illustrates the operation of an exemplary method or methods, a result of execution of computer program instructions embodied on a computer readable memory, functions performed by logic implemented in hardware, and/or interconnected means for performing functions in accordance with exemplary embodiments.

Specifically, item 1200 in FIG. 12 shows a method. In item 1202, it is determined whether a DRX cycle is larger than a DRX cycle threshold. In item 1204, the mobility state of a user equipment is determined, where that determination is based on one of a new TCI state for PDCCH for at least one of the CORESETs is configured, UE rotational activity exceeds specific threshold limit i.e. X degrees after network indicates UE to be in low mobility state, and/or UE activates new panel due to signal quality degradation. In item 1206, in response to these determinations, the RRM measurement period is scaled.

The YYY module 740 or the ZZZ module 750 may include multiples ones of the blocks in FIG. 12, where each included block is an interconnected means for performing the function in the block. The blocks in FIG. 12 are assumed to be performed by the UE 710, e.g., under control of the YYY module 740 or ZZZ module 750 at least in part.

Without in any way limiting the scope, interpretation, or application of the claims appearing below, a technical effect of one or more of the example embodiments disclosed herein is that it enables further energy saving in beam management/RRM measurements in DRX mode when UE is in low/stationary mobility state by extending measurement period in specific scenarios.

Without in any way limiting the scope, interpretation, or application of the claims appearing below, another technical effect of one or more of the example embodiments disclosed herein is that it allows panel specific savings for beam management RRM measurements, by allowing opportunistic panel specific deactivation/relaxation of measurements.

Without in any way limiting the scope, interpretation, or application of the claims appearing below, another technical effect of one or more of the example embodiments disclosed herein is that a UE will not completely ignore the RRM measurements, in other words it will perform neighbor cell scanning/intra cell measurements and cell detection measurements but in more relaxed manner.

Without in any way limiting the scope, interpretation, or application of the claims appearing below, another technical effect of one or more of the example embodiments disclosed herein is that the network can enable/disable UE power saving in specific scenarios by controlling the mobility state evaluation and the length of the threshold cycle for UE. For instance, in the case where a UE may be stationary but it is beneficial to use short DRX cycle, that is due to latency requirement, the network can still employ more relaxed RRM measurements to enable energy saving when UE is in low/non-mobility state.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 7. A computer-readable medium may comprise a computer-readable storage medium (e.g., memories 725, 755, 771 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

An example of an embodiment of the current invention, which can be referred to as item 1, is a method comprising: determining whether a DRX cycle is larger than a DRX cycle threshold; determining the mobility state of a user equipment, wherein the determining is based on one of: (i) new TCI state for PDCCH for at least one of the CORESETs is configured, (ii) UE rotational activity exceeds specific threshold limit i.e. X degrees after network indicates UE to be in low mobility state, (iii) UE activates new panel due to signal quality degradation or an applied threshold condition of the mobility parameter; and, in response to the determining, scaling RRM measurement period.

An example of another embodiment of the current invention, which can be referred to as item 2, is the method of item 1, wherein the UE determines the mobility of the UE, or wherein the network indicates to UE whether the UE is in stationary or low mobility state.

An example of another embodiment of the current invention, which can be referred to as item 3, is the method of item 1, wherein the network determines the mobility of UE via UE reports or measurements.

An example of another embodiment of the current invention, which can be referred to as item 4, is the method of item 1, wherein the scaling/relaxing of RRM measurements comprises: if DRX is used, the UE may apply extended relaxation for RRM measurements for measurements performed in non active time; and if RX beamforming is used, the scaling is applied per antenna panel/beam used for RRM measurements.

An example of another embodiment of the current invention, which can be referred to as item 5, is the method of item 1, wherein the scaling/relaxing of RRM measurements are applied differently for low mobility and stationary states.

An example of further embodiment of the current invention, which can be referred to as item 6, is a method comprising: evaluating a mobility state for a UE to be low or stationary; comparison of the evaluated mobility state to a defined mobility state; in response to the evaluated mobility state of the UE being within bounds of the defined mobility state, scaling/relaxing of RRM measurements.

An example of yet a further embodiment of the current invention, which can be referred to as item 7, is the method of item 6, wherein the evaluating comprises ascertaining a DRX cycle length of the UE, wherein the defined mobility state is a DRX cycle threshold; wherein the comparing comprises determining the DRX cycle length of the UE with the DRX cycle threshold; and wherein being within the bounds comprises determining the DRX cycle length of the UE to be greater than the DRX cycle threshold.

An example of yet a further embodiment of the current invention, which can be referred to as item 8, is the method of any of the previously discussed items, wherein the DRX cycle threshold is predefined and/or signaled to the UE by the network.

An example of an additional embodiment of the current invention, which can be referred to as item 9, is the method of item 1, wherein the comparing comprises: starting a timer upon the UE evaluating the mobility state to be low or stationary; and comparing a measured mobility parameter to a threshold mobility value; wherein being within the bounds comprises: determining the measured mobility parameter to be below the threshold mobility value for the duration of the timer (until it expires).

An example of an additional embodiment of the current invention, which can be referred to as item 10, it the method of any previous item, wherein the mobility parameter is based on at least one of: velocity of the UE, a number of handover/PDCCH beam change, and/or coverage of a specific beam or set of beams.

An example of an additional embodiment of the current invention, which can be referred to as item 11, it the method of any previous item, wherein the threshold mobility parameter is predefined and/or signaled to the UE by the network.

An example of an additional embodiment of the current invention, which can be referred to as item 12, it the method of any previous item, wherein the evaluating comprises, in response to a network indicating to the UE that the network evaluated the UE as being in RRC CONNECTED mode, judging the UE, from network perspective, to explicitly be in a low or a stationary mobility state.

An example of an additional embodiment of the current invention, which can be referred to as item 13, it the method of any previous item, wherein the comparing comprises the UE exiting a low or a stationary mobility state upon one of the following conditions being met: a new TCI state for PDCCH for at least one of CORESETs is configured; UE rotational activity exceeds a specific threshold limit; the UE activates a new panel due to signal quality degradation or a threshold condition of the mobility parameter is applied; determining change in mobility state.

An example of another embodiment of the current invention is an apparatus comprising: at least one processor; and at least one memory including computer program code, the at least one memory and the computer program code configured to, with the at least one processor, cause the apparatus to perform at least the steps of any of the methods discussed in any of the items above or elsewhere within this disclosure. Moreover, an example of still another embodiment of the current invention is an apparatus comprising means to perform each step of each method described in the items above or elsewhere within this disclosure.

Thus, an example of an embodiment of the current invention, which can be referred to as item 14, is an apparatus comprising at least one processor; and at least one memory including computer program code, the at least one memory and the computer program code configured to, with the at least one processor, cause the apparatus to perform at least: determining whether a DRX cycle is larger than a DRX cycle threshold; determining the mobility state of a user equipment, wherein the determining is based on one of: (i) new TCI state for PDCCH for at least one of the CORESETs is configured, (ii) UE rotational activity exceeds specific threshold limit i.e. X degrees after network indicates UE to be in low mobility state, (iii) UE activates new panel due to signal quality degradation; and, in response to the determining, scaling RRM measurement period.

An example of another embodiment of the current invention, which can be referred to as item 15, is the apparatus of item 14, wherein the UE determines the mobility of the UE, or wherein the network indicates to UE whether the UE is in stationary or low mobility state.

An example of another embodiment of the current invention, which can be referred to as item 16, is the apparatus of item 14, wherein the network determines the mobility of UE via UE reports or measurements.

An example of another embodiment of the current invention, which can be referred to as item 17, is the apparatus of item 14, wherein the scaling/relaxing of RRM measurements comprises: if DRX is used, the UE may apply extended relaxation for RRM measurements for measurements performed in non active time; and if RX beamforming is used, the scaling is applied per antenna panel/beam used for RRM measurements.

An example of another embodiment of the current invention, which can be referred to as item 18, is the apparatus of item 14, wherein the scaling/relaxing of RRM measurements are applied differently for low mobility and stationary states.

An example of further embodiment of the current invention, which can be referred to as item 19, is an apparatus comprising at least one processor; and at least one memory including computer program code, the at least one memory and the computer program code configured to, with the at least one processor, cause the apparatus to perform at least: evaluating a mobility state for a UE to be low or stationary; comparison of the evaluated mobility state to a defined mobility state; in response to the evaluated mobility state of the UE being within bounds of the defined mobility state, scaling/relaxing of RRM measurements.

An example of yet a further embodiment of the current invention, which can be referred to as item 20, is the apparatus of item 19, wherein the evaluating comprises ascertaining a DRX cycle length of the UE, wherein the defined mobility state is a DRX cycle threshold; wherein the comparing comprises determining the DRX cycle length of the UE with the DRX cycle threshold; and wherein being within the bounds comprises determining the DRX cycle length of the UE to be greater than the DRX cycle threshold.

An example of yet a further embodiment of the current invention, which can be referred to as item 21, is the apparatus of any of the previously discussed items, wherein the DRX cycle threshold is predefined and/or signaled to the UE by the network.

An example of an additional embodiment of the current invention, which can be referred to as item 22, is the apparatus of item 19, wherein the comparing comprises: starting a timer upon the UE evaluating the mobility state to be low or stationary; and comparing a measured mobility parameter to a threshold mobility value; wherein being within the bounds comprises: determining the measured mobility parameter to be below the threshold mobility value for the duration of the timer (until it expires).

An example of an additional embodiment of the current invention, which can be referred to as item 23, it the apparatus of any previous item, wherein the mobility parameter is based on at least one of: velocity of the UE, a number of handover/PDCCH beam change, and/or coverage of a specific beam or set of beams.

An example of an additional embodiment of the current invention, which can be referred to as item 24, it the apparatus of any previous item, wherein the threshold mobility parameter is predefined and/or signaled to the UE by the network.

An example of an additional embodiment of the current invention, which can be referred to as item 25, it the apparatus of any previous item, wherein the evaluating comprises, in response to a network indicating to the UE that the network evaluated the UE as being in RRC CONNECTED mode, judging the UE, from network perspective, to explicitly be in a low or a stationary mobility state.

An example of an additional embodiment of the current invention, which can be referred to as item 26, it the apparatus of any previous item, wherein the comparing comprises the UE exiting a low or a stationary mobility state upon one of the following conditions being met: a new TCI state for PDCCH for at least one of CORESETs is configured; UE rotational activity exceeds a specific threshold limit; the UE activates a new panel due to signal quality degradation; determining change in mobility state.

An example of yet another embodiment of the current invention is computer program product comprising a computer-readable medium bearing computer program code embodied therein for use with a computer, the computer program code comprising code for each step of each method described in the items above or elsewhere within this disclosure. Moreover, an example of still another embodiment of the current invention is computer program with program code to perform each step of each method described in the items above or elsewhere within this disclosure.

As such, another example of an embodiment of the current invention is computer program product embodied on a non-transitory computer-readable medium in which a computer program is stored that, when executed by a computer, is configured to provide instructions to control or carry out: determining whether a DRX cycle is larger than a DRX cycle threshold; determining the mobility state of a user equipment, wherein the determining is based on one of: (i) new TCI state for PDCCH for at least one of the CORESETs is configured, (ii) UE rotational activity exceeds specific threshold limit i.e. X degrees after network indicates UE to be in low mobility state, or one of (iii) UE activates new panel due to signal quality degradation, or (iv) applies a threshold condition of the mobility parameter; and, in response to the determining, scaling RRM measurement period.

FIG. 13 illustrates operations which may be performed by a network device such as, but not limited to, a RAN node 170 as in FIG. 7 or an eNB. As shown in step 1310 of FIG. 13 there is determining a mobility or measurement adaptation state of a user equipment, wherein the determining is based on one of, as shown in step 1320 of FIG. 13, a new transmission configuration indication state for physical downlink control channel for at least one control resource set is configured, user equipment rotational activity exceeds specific threshold limit of a threshold associated with a mobility parameter by X degrees after network indicates user equipment to be in low mobility or measurement adaptation state, user equipment activates new panel due to signal quality degradation, or a threshold condition of the mobility parameter is applied. Then as shown in step 1330 of FIG. 13 there is, in response to the determining, scaling or relaxing at least one of a radio resource management measurement period or a threshold condition of the mobility parameter.

In accordance with the example embodiments as described in the paragraph above, wherein the user equipment determines the mobility or measurement adaptation state of the user equipment, or wherein the network indicates to user equipment whether the user equipment is in stationary or low mobility or measurement adaptation state.

In accordance with the example embodiments as described in the paragraphs above, wherein the at least one of scaling of relaxing the threshold condition of the mobility parameter comprises scaling or relaxing threshold values of a threshold mobility value associated with at least one of velocity, satellite positioning, LTE/NR positioning, or wifi positioning that is compared to a specific threshold value.

In accordance with the example embodiments as described in the paragraphs above, wherein the at least one of scaling or relaxing the radio resource management measurements comprises: if discontinuous reception is used, the user equipment may apply extended relaxation for radio resource management measurements for measurements performed in non-active time; and if receiver beamforming is used, the scaling is applied per antenna panel/beam used for radio resource management measurements.

In accordance with the example embodiments as described in the paragraphs above, wherein the at least one of scaling or relaxing of radio resource management measurements or a threshold condition of the mobility parameter are applied differently for low mobility and stationary states. In accordance with the example embodiments as described in the paragraphs above, there is evaluating a mobility or measurement adaptation state for a user equipment to be low or stationary; and comparing an evaluated mobility or measurement adaptation state to a defined mobility or measurement adaptation state; and in response to the evaluated mobility or measurement adaptation state of the user equipment being within bounds of the defined mobility or measurement adaptation state, at least one of scaling or relaxing of radio resource management measurements.

In accordance with the example embodiments as described in the paragraphs above, wherein the evaluating comprises ascertaining a discontinuous reception cycle length of the user equipment, wherein the defined mobility or measurement adaptation state is a discontinuous reception cycle threshold; wherein the comparing comprises determining the discontinuous reception cycle length of the user equipment with the discontinuous reception cycle threshold; and wherein being within the bounds comprises determining the discontinuous reception cycle length of the user equipment to be greater than the discontinuous reception cycle threshold.

In accordance with the example embodiments as described in the paragraphs above, wherein the discontinuous reception cycle threshold is predefined and/or signaled to the user equipment by the network.

In accordance with the example embodiments as described in the paragraphs above, wherein the comparing the evaluated mobility or measurement adaptation state comprises: starting a timer upon the user equipment evaluating the mobility or measurement adaptation state to be low or stationary; and comparing a measured mobility parameter to the threshold mobility value, wherein being within the bounds comprises: determining the measured mobility parameter to be one of above or below the threshold mobility value for the duration of the timer (until it expires).

In accordance with the example embodiments as described in the paragraphs above, wherein the threshold mobility value is predefined and/or signaled to the user equipment by the network.

In accordance with the example embodiments as described in the paragraphs above, wherein if the measured mobility parameter is above specific threshold then the user equipment is allowed to relax radio resource management measurements, or if measured mobility parameter is below specific threshold, then the user equipment is considered to be in the evaluated mobility state for the at least one of scaling or relaxing the radio resource management measurements.

In accordance with the example embodiments as described in the paragraphs above, wherein the measured mobility parameter is based on at least one of: velocity of the user equipment, a number of handover/physical downlink control channel beam change, number of beam change, or a coverage of a specific beam or set of beams.

In accordance with the example embodiments as described in the paragraphs above, wherein radio resource management for the mobility or measurement adaptation state comprises adaptation reporting of measurements in addition to or alternative to the at least one of scaling or relaxing of radio resource management measurements.

In accordance with the example embodiments as described in the paragraphs above, wherein the evaluating the mobility or measurement adaptation state to be low or stationary comprises, in response to a network indicating to the user equipment that the network evaluated the user equipment as being in RRC CONNECTED mode, judging the user equipment, from network perspective, to explicitly be in a low or a stationary mobility or measurement adaptation state.

In accordance with the example embodiments as described in the paragraphs above, wherein the comparing the evaluated mobility or measurement adaptation state comprises: the user equipment exiting a low or a stationary mobility or measurement adaptation state upon one of: a new transmission configuration indication state for physical downlink control channel for at least one control resource set is configured; the user equipment rotational activity exceeds a specific threshold limit; the user equipment activates a new panel due to signal quality degradation; and determining change in mobility or measurement adaptation state.

In accordance with the example embodiments as described in the paragraphs above, wherein the user equipment continuously evaluates the mobility state by restarting a T1_mobility_state_radio resource management timer and evaluating the measured mobility parameter against the mobility parameter threshold. When a condition does not apply, then the UE cannot use the scaling for RRM measurements for the evaluated condition.

A non-transitory computer-readable medium (Memory(ies) 755 as in FIG. 7) storing program code (Computer Program Code 753 and/or ZZZ Module 750-2 as in FIG. 7), the program code executed by at least one processor (Processors 752 and/or ZZZ Module 750-1 as in FIG. 7) to perform the operations as at least described in the paragraphs above.

In accordance with an example embodiment of the invention as described above there is an apparatus comprising: means for determining (Memory(ies) 755; Computer Program Code 753 and/or ZZZ Module 750-2; and Processors 752 and/or ZZZ Module 750-1 as in FIG. 7) a mobility or measurement adaptation state of a user equipment (UE 710 as in FIG. 7), wherein the determining is based on one of: a new transmission configuration indication state for physical downlink control channel for at least one control resource set is configured, user equipment rotational activity exceeds specific threshold limit of a threshold associated with a mobility parameter by X degrees after network indicates user equipment to be in low mobility or measurement adaptation state, user equipment activates new panel due to signal quality degradation, or a threshold condition of the mobility parameter is applied; and, in response to the determining, at least one of scaling or relaxing (Memory(ies) 755; Computer Program Code 753 and/or ZZZ Module 750-2; and Processors 752 and/or ZZZ Module 750-1 as in FIG. 7) a radio resource management measurement period, or a threshold condition of the mobility parameter.

In the example aspect of the invention according to the paragraph above, wherein at least the means for determining and scaling or relaxing comprises a non-transitory computer readable medium [Memory(ies) 755 as in FIG. 7] encoded with a computer program [Computer Program Code 753 and/or ZZZ Module 750-2 as in FIG. 7] executable by at least one processor [Processors 752 and/or ZZZ Module 750-1 as in FIG. 7].

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

The invention claimed is:

1. A method, comprising:
   determining a measurement adaptation state of a user equipment, wherein the determining is based on:
   a new transmission configuration indication state for physical downlink control channel for at least one control resource set is configured,
   and
   in response to the determining, scaling or relaxing a radio resource management measurement period and a threshold condition of a mobility parameter, wherein the at least one of scaling or relaxing the threshold condition of the mobility parameter comprises scaling or relaxing threshold values of a threshold mobility value associated with velocity, satellite positioning, LTE/NR positioning, and wifi positioning that is compared to a specific threshold value.

2. The method of claim 1, wherein the user equipment determines the measurement adaptation state of the user equipment, and the network indicates to user equipment whether the user equipment is in measurement adaptation state.

3. The method of claim 1, wherein the at least one of scaling or relaxing the radio resource management measurements comprises: if discontinuous reception is used, the user equipment may apply extended relaxation for radio resource management measurements for measurements performed in non-active time; and if receiver beamforming is used, the scaling is applied per antenna panel/beam used for radio resource management measurements, and wherein the method further comprises performing measurement adaptation by determining measurement frequency and bandwidth information and determining alternative center frequency or frequency location for the measurements.

4. An apparatus, comprising at least one processor; and at least one non-transitory memory storing instructions, that when executed by the at least one processor, to cause the apparatus at least to:

determine a measurement adaptation state of a user equipment, wherein the determining is based on:

a new transmission configuration indication state for physical downlink control channel for at least one control resource set is configured, and in response to the determining, scale or relax a radio resource management measurement period and a threshold condition of a mobility parameter, wherein the at least one of scaling or relaxing the threshold condition of the mobility parameter comprises scaling or relaxing threshold values of a threshold mobility value associated with velocity, satellite positioning, LTE/NR positioning, and wifi positioning that is compared to a specific threshold value.

5. The apparatus of claim 4, wherein the user equipment determines the measurement adaptation state of the user equipment, and the network indicates to user equipment whether the user equipment is in measurement adaptation state.

6. The apparatus of claim 4, wherein the at least one of scaling or relaxing of radio resource management measurements comprises: if discontinuous reception is used, the user equipment may apply extended relaxation for radio resource management measurements for measurements performed in non-active time; and if receiver beamforming is used, the scaling is applied per antenna panel/beam used for radio resource management measurements, and wherein the at least one non-transitory memory stores instructions executed by the at least one processor, to cause the apparatus at least to:

perform measurement adaptation by determining measurement frequency and bandwidth information and determining alternative center frequency or frequency location for the measurements.

7. The apparatus of claim 6, wherein the at least one of scaling or relaxing of radio resource management measurements are applied differently for low mobility and stationary states.

8. The apparatus of claim 7, comprising the at least one non-transitory memory storing instructions executed by the at least one processor, to cause the apparatus at least to:

evaluate a measurement adaptation state for a user equipment to be low or stationary;

compare the evaluated measurement adaptation state to a defined measurement adaptation state; and in response to the evaluated measurement adaptation state of the user equipment being within bounds of the defined measurement adaptation state, scale or relax radio resource management measurements, wherein the comparing comprises:

starting a timer upon the user equipment evaluating the measurement adaptation state to be low or stationary; and comparing a measured mobility parameter to a threshold mobility value, wherein being within the bounds comprises: determining the measured mobility parameter to be below the threshold mobility value for the duration of the timer, wherein if measured mobility parameter is below specific threshold, then the user equipment is considered to be in the evaluated mobility state for the at least one of scaling or relaxing the radio resource management measurements, wherein the measured mobility parameter is based on velocity of the user equipment, a number of handover/physical downlink control channel beam change, and a coverage of a specific beam or set of beams.

9. The apparatus of claim 8, wherein the comparing the evaluated measurement adaptation state comprises the user equipment exiting a measurement adaptation state upon the following conditions being met: a new transmission configuration indication state for physical downlink control channel for at least one control resource set is configured.

10. The apparatus of claim 4, wherein evaluating a measurement adaptation state comprises ascertaining a discontinuous reception cycle length of the user equipment, wherein the defined measurement adaptation state is a discontinuous reception cycle threshold; wherein the comparing comprises determining the discontinuous reception cycle length of the user equipment with the discontinuous reception cycle threshold; and wherein being within the bounds comprises determining the discontinuous reception cycle length of the user equipment to be greater than the discontinuous reception cycle threshold.

11. The apparatus according to claim 10, wherein the discontinuous reception cycle threshold is predefined and signaled to the user equipment by the network.

12. The apparatus of claim 4, wherein radio resource management for the measurement adaptation state comprises adaptation reporting of measurements in addition to or alternative to the at least one of scaling or relaxing of radio resource management measurements.

13. The apparatus of claim 4, wherein the evaluating the mobility or measurement adaptation state for a user equipment to be low or stationary comprises, in response to a network indicating to the user equipment that the network evaluated the user equipment as being in RRC CONNECTED mode, judging the user equipment, from network perspective, to explicitly be in a low or a stationary mobility or measurement adaptation state.

14. The apparatus of claim 4, wherein the user equipment continuously evaluates the mobility state by restarting a timer and evaluating the measured mobility parameter against the mobility parameter threshold; and wherein when a condition does not apply, the user equipment does not use the scaling for radio resource management measurements for the evaluated condition.

15. A computer program product embodied on a non-transitory computer-readable medium in which a computer program is stored that, when executed by a computer, is configured to provide instructions to cause an apparatus at least to:
- determine a measurement adaptation state of a user equipment, wherein the determining is based on:
- a new transmission configuration indication state for physical downlink control channel for at least one control resource set is configured,
- in response to the determining, scale or relax a radio resource management measurement period and a threshold condition of the mobility parameter, wherein the at least one of scaling or relaxing the threshold condition of the mobility parameter comprises scaling or relaxing threshold values of a threshold mobility value associated with velocity, satellite positioning, LTE/NR positioning, and wifi positioning that is compared to a specific threshold value.

* * * * *